United States Patent
Johnson

[15] 3,645,782
[45] Feb. 29, 1972

[54] COVERED WELDING ELECTRODE

[72] Inventor: Edwin W. Johnson, Murrysville, Pa.
[73] Assignee: Westinghouse Electric Corporation, Pittsburgh, Pa.
[22] Filed: Mar. 7, 1969
[21] Appl. No.: 805,233

[52] U.S. Cl. ...............................117/205, 117/207, 148/26, 219/146
[51] Int. Cl. .....................................B23k 35/00, C23d 3/00
[58] Field of Search..............117/205, 207; 148/26; 219/146

[56] References Cited

UNITED STATES PATENTS

| | | | |
|---|---|---|---|
| 3,181,970 | 5/1965 | Peck et al. | 117/205 |
| 3,490,942 | 1/1970 | Lalieu | 117/205 |

*Primary Examiner*—William L. Jarvis
*Attorney*—F. Shapoe and Lee P. Johns

[57] ABSTRACT

A covered welding electrode for making fully austenitic steel welds characterized by high strength, good ductility, and acceptable impact resistance at all temperatures from near to absolute zero up to at least 900° F. The electrode comprises a fully austenitic steel core wire enclosed by a coating comprising a particular mixture of nonmetallic and metallic ingredients. The nonmetallic ingredients include an alkaline-earth carbonate, at least one oxide of the group consisting of $Al_2O_3$ and $Cr_2O_3$, at least one fluoride of the group consisting of $CaF_2$ and cryolite, a silicate binder, at least one substance of the group consisting of $TiO_2$ and the titanates of sodium, potassium, and calcium. In addition, at least one of the group consisting of $SiO_2$, feldspar, calcium silicate may be added as an optional ingredient. The metallic ingredients include at least one metal powder selected from the group consisting of Fe, Ni, Cr, Mn, and master base alloys of Mo, V, Al, and B.

7 Claims, 1 Drawing Figure

PATENTED FEB 29 1972          3,645,782
WITNESSES
Theodore F. Wrobel
James F. Young
INVENTOR
Edwin W. Johnson
BY Lee P. Johns
ATTORNEY 3,645,782

COVERED WELDING ELECTRODE

BACKGROUND OF THE INVENTION

1. Field of the Invention

This invention relates to an electrode for use in arc welding of structures of fully austenitic steel and related alloys, which structures are intended for service at temperature at from near absolute zero up to at least 900° F., and particularly those structures intended for service at very low (cryogenic) temperatures. More particularly, the invention pertains to a covered welding electrode for use in manual arc welding.

2. Description of the Prior Art

The need for large welded structures of high-performance alloys for use at extremely low temperatures has become important in recent years. An example of such structures is those that are used in the testing of large liquid-hydrogen-fueled rockets, which testing involves the use of large tanks containing liquid hydrogen under pressure that forces the liquid hydrogen fuel into the rocket engine at a high volumetric speed. Only large pressure vessels made of materials having satisfactory mechanical properties at both cryogenic and ambient temperatures can be safely used as such liquid-hydrogen containers.

Many metallic structural materials are unsuitable for cryogenic uses because of the fact that their strength and ductility properties at cryogenic temperatures are too radically different from those at room temperature. The usual behavior is for the yield strength to rise and for the ductility to drop with decreasing temperature. In the case of ferritic steels, the rates of rise of yield strength and of drop of ductility with decreasing temperature are so high that the materials are excessively brittle at temperatures still well above the cryogenic temperatures of required service. The so-called "austenitic stainless steels," such as those containing about 18% Cr and 8% Ni, usually undergo at least a partial transformation of the austenite into martensite upon being cooled to cryogenic temperatures, and these steels consequently also exhibit an excessive rate of rise of the yield strength accompanied by an excessive rate of loss of the ductility as the temperature is lowered. Another disadvantage is that the strengths of the 18% Cr., 8% Ni steels at room temperature are not especially high.

Base and weld-metal alloys that are fully austenitic at all temperatures and exhibit no tendency to transform under even the most extreme conditions of temperature and deformation are preferable for use as cryogenic structural materials due to their relatively low rates of rise of yield strength and correspondingly less severe loss of ductility with decreasing temperature. However, many fully austenitic steels are difficult to weld due to the tendency of the welds to crack during the initial stages of cooling from their solidification temperature. This weld hot cracking tendency has had the effect of discouraging the use of fully austenitic steels in applications where sound welds are necessary, including particularly the construction of cryogenic pressure vessels.

A group of fully austenitic steels possessing superior ability to resist weld hot cracking is described in U.S. Pat. No. 3,201,233. The composition ranges of these alloys are reproduced in Table I (below). The strength properties of the alloys are sensitive functions of their carbon, nitrogen, and vanadium content. The lowest-strength alloys of the group, which have C, N, and V contents near the lower limits of the respective ranges, have strength properties at elevated temperatures similar to those of AISI Type 316 stainless steel, but their ductility and impact properties at cryogenic temperatures are much more favorable because of the complete stability of the austenite.

Fully austenitic alloys having much higher strengths at all temperatures result from the presence of larger amounts of C, N, and V approaching the maximum concentrations of these elements as shown in Table I. These higher-strength alloys are particularly suitable for use as cryogenic pressure-vessel materials, in that both the base material and the welds of these alloys possess both high strength and good ductility at both room and cryogenic temperatures. All of the alloys with compositions falling within the limits of Table I will be herein referred to as "special alloys."

TABLE I

| | Weight Percent |
|---|---|
| Chromium | 14–20 |
| Nickel | 15–30 |
| Manganese | 7.5–15 |
| Molybdenum | 0.5–3.75 |
| Mn & Mo total | 9–16 |
| Carbon | 0.01–0.08 |
| Nitrogen | 0.01–0.35 |
| Silicon | up to 1 |
| Vanadium | up to 0.3 |
| Boron | up to 0.03 |
| Zirconium | up to 0.06 |
| Iron | balance |

Although the special alloys have highly favorable properties at cryogenic temperatures, attempts to manually weld these alloys with covered welding electrodes made in accordance with the prior art have presented serious problems. The prior art electrodes have had coatings such as are used with conventional manual stainless-steel, covered welding electrodes, on core wires of the special alloys. Particularly severe difficulties have been encountered in attempts to weld the higher-strength special alloys containing at least 0.2 percent nitrogen, where it has been found that the transfer of the molten metal from the electrode tip to the weld puddle is excessively globular and also that the removal of the solidified slag from the weld bead following freezing of the weld metal is extremely difficult. As a consequence, the welds tend to be unsatisfactory because they contain excessive quantities of slag inclusions and have inferior ductility and impact resistance.

In addition to the foregoing considerations, manual welding is a preferred method of assembling large structures. The welding must be performed in various positions such as the so-called horizontal, vertical, and overhead positions as well as in the flat position which variety of positions are not conveniently performable by automatic welding equipment. Electrodes having excessively globular molten-metal transfer characteristics are unuseable for such multiposition welding, and therefore even the most elementary covered-electrode welding requirements cannot be satisfied by the higher-strength special-alloy electrodes prepared in accordance with the prior art.

SUMMARY OF THE INVENTION

It has been found in accordance with this invention that the problems encountered in attempting to manually weld high-strength fully austenitic steels with covered electrodes made in conformance with the prior art may be overcome by the provision of a covered welding electrode comprising a combination of a special alloy core wire and a particular coating, which coating is composed of a mixture of compounds and other materials having the properties of enabling the electrode to be used in all welding positions, of providing easy slag removal and other desirable welding characteristics, and of providing welds possessing desirable and useful mechanical properties at all temperatures from near absolute zero up to at least 900° F.

Accordingly, it is a general object of this invention to provide a fully austenitic steel covered welding electrode which is composed of materials conducive to good weldability and superior mechanical properties of the welded joint at all temperatures up to at least 900° F.

It is another object of this invention to provide a covered welding electrode which results in welded joints characterized by a high degree of cleanliness and freedom from slag inclusions.

It is another object of this invention to provide a welding electrode for providing weld metal of high-strength fully austenitic steel, which electrode can be used for welding in various positions.

Finally, it is an object of this invention to provide a covered welding electrode which provides a welded joint which when cooled to cryogenic temperatures retains acceptable ductility and impact resistance.

Generally, the covered welding electrode of the present invention comprises a fully austenitic steel core wire with a coating composed of both (1) nonmetallic and (2) metallic ingredients optionally. The nonmetallic ingredients include an alkaline-earth carbonate, at least one oxide of the group consisting of $Al_2O_3$ and $Cr_2O_3$, at least one fluoride of the group consisting of $CaF_2$ and cryolite, a silicate binder, at least one substance of the group consisting of $TiO_2$ and the titanates of sodium, potassium, and calcium, and any number of substances of the group consisting of $SiO_2$, calcium silicate, feldspar, and a water-soluble organic gum. The metallic ingredients include one or more members of the group comprising the metallic powders of Fe, Ni, Cr, Mn, and of various master base alloys of Mo, V, Al, and B. The various coating ingredients are provided in particular proportions conducive to optimum performance of the electrode with respect to multiposition welding capability, ease of slag removal, and other aspects of weldability as well as for the optimization of the mechanical properties of the welded joint. The metallic ingredients also have the function of improving the mechanical integrity of the coating itself in addition to performing various alloying and deoxidation functions.

BRIEF DESCRIPTION OF THE DRAWING

For a better understanding of the nature and objects of the invention, reference should be made to the attached drawing showing a vertical sectional view of the coated welding electrode.

DESCRIPTION OF THE PREFERRED EMBODIMENT

In the drawing, a covered welding electrode of the type constituting this invention is generally indicated at 10. The electrode includes a wire core 12 which is covered over most of its length by a coating 14.

The wire core 12 is composed of a fully austenitic alloy steel, a preferred composition of which is that of the special alloys described in Table I.

The diameter of the wire 12 is preferably in the range of three-thirty seconds to three-sixteenth inch, but thicker wire may be employed. The length of the three-thirty second inch diameter wire is desirably about 8 inches while that of the wires of diameter one-eighth to three-sixteenth inch is desirably about 14 inches.

The annular thickness of the coating 14 is preferably about one-third the diameter of the wire 12. Thus, an overall electrode diameter of 0.25 inch is preferable when the core wire of diameter five-thirty second inch, and approximately the same ratio of coating thickness to wire diameter is preferable in electrodes based upon wires of other diameters. The coating is preferably applied to the wire in the form of a thick aqueous paste, for example by extrusion, following which the electrodes are baked in increasing-temperature steps to a temperature of about 700° to 800° F., the purpose of this baking being to dry and harden the coating and to impart to it a high degree of mechanical integrity.

COATING COMPOSITION

The units employed herein for expressing the proportions of the various coating ingredients are "parts by weight" (pbw). One pbw as used herein is defined as 1 percent of the total weight of only the nonmetallic ingredients of the coating, exclusive of any $H_2O$ that may be present. The amounts of the various metallic ingredients are also expressed in pbw, and therefore the total number of pbw exceeds 100 by an amount proportional to the total weight of metal powder. For example, a metal powder content of 30 percent of the total coating dry weight is equivalent to a metal powder content of about 43 pbw so that the entire coating has a total ingredient content of 143 pbw.

NONMETALLIC INGREDIENTS

The identities and proportions of the various nonmetallic ingredients of the coating portion of the invention are those which, when used together in accordance with the formulas herein described, will provide a favorable balance of all desired properties. These properties include those concerned with both the behavior of the electrode during welding and the mechanical integrity of the weld metal. The various aspects of the behavior of the electrode during welding that are optimized by the invention include the ability of the electrode to be used for welding in various positions, stability of the welding arc, freedom from excessively globular molten-metal transfer, freedom from molten-slag interference, completeness of slag coverage over the weld bead, ease of solid slag removal from the solidified weld bead, freedom from weld-bead cracks and porosity, and weld-bead regularity and flatness. Aspects of the mechanical integrity of the weld metal that are optimized by the invention include freedom from slag inclusions, freedom from fissures on bend testing, and a useful combination of strength, ductility, and impact resistance of the welded joint at all temperatures of intended use.

The nonmetallic portion of the coating which comprises a total of 100 pbw consists essentially of:

a. from 20 to 70 pbw of at least one titanium containing compound selected from the group consisting of $TiO_2$, and titanates of alkali and alkaline earth metals;

b. from 10 to 25 pbw of a carbonate of an alkaline earth metal;

c. a total of from 8 to 10 pbw of at least one oxide of the group of $Al_2O_3$ and $Cr_2O_3$;

d. a total of from 4 to 20 pbw of at least one fluoride selected from the group consisting of $CaF_2$ and $Na_3AlF_6$;

e. from 10 to 18 pbw of at least one alkali metal silicate as an inorganic binder;

f. up to 15 pbw of $SiO_2$ or a high silicate compound and g. up to 3 pbw of a slip agent, such for example as a feldspar clay or an organic gum.

The coating of the invention contains a relatively high proportion of Titania ($TiO_2$) in any of its several forms. These include rutile and anatase as well as the titanates of various alkali and alkaline-earth elements, including particularly the titanates of sodium, potassium, and calcium. The total amount of these substances in the coating is in the range of from about 20 to 70 pbw, and a particularly preferred range is from about 40 to about 62 pbw with an optimum of 52 pbw. The use of one or more of the titanates is desirable in part because of the basicity imparted to the slag by these substances, such basicity being desirable as an aid to limiting contamination of the weld metal by acid-oxide-forming elements such as sulfur and phosphorus. However, the physical form in which the titanates are usually obtainable is that of a fine powder, and when present in large proportions such powder renders more difficult the formation of a satisfactory coating bond. Rutile is obtainable in both fine-powder and granular forms, and the use of a certain amount of the granular form is usually desirable to aid the formation of well-bonded coatings. The proportions of the granular and powdered forms of rutile, of anatase, and of the various powdered titanates in the coating may be correlated to provide a good coating bond. Thus 10 pbw of granular rutile (N30 mesh) will give good results.

The coating also contains at least one alkaline earth carbonate, preference being given to $CaCO_3$. Such carbonate is a desirable ingredient because it decomposes during welding to yield $CO_2$ gas, which serves as a gas atmosphere shield for the welding, as well as to an alkaline-earth oxide, such as CaO, that imparts a high degree of basicity to the slag. The preferred range of alkaline-earth carbonate is from about 5 to about 35 pbw, and a particularly preferred range is from about 10 to about 25 pbw of $CaCO_3$ with an optimum of 20 pbw.

Another ingredient of the coating is a silicate binder. This is added in the form of an aqueous solution or suspension of for example either sodium or potassium silicate or a mixture thereof. Good results are obtained with a $Na_2O \cdot 3SiO_2$ compound. The preferred range of the total amount of such silicates, not counting their $H_2O$ contents, is from about 10 to about 18 pbw with a preferred content of 13 pbw.

A slip agent may also be added to assist extrusion of the coating onto the core wire during electrode manufacture. This slip agent may be one of any of several clays such as feldspar, but the preferred material for this purpose in the present invention is a water-soluble organic gum such as sodium carboxymethyl cellulose (CMC), and similar cellulosic derivates the preferred amount being from about 1 to about 2 pbw.

Another coating ingredient is at least one metal oxide of the group consisting of $Al_2O_3$ and $Cr_2O_3$, the presence of either or both of which is beneficial to the physical properties of the molten slag during welding as well as beneficial to the ease of a slag removal after solidification of the weld bead and slag. The preferred range of the total amount of both $Cr_2O_3$ and $Al_2O_3$ is from about 5 to about 15 pbw, the preferred amount being about 8 to 10 pbw of $Al_2O_3$.

The coating also contains at least one fluoride of the group of $CaF_2$ and cryolite ($Na_3AlF_6$), the total amount being at least 4 pbw and usually no more than about 20 pbw. A particularly preferred choice is cryolite at 4 to 6 pbw. The fluoride imparts stability and smoothness to the welding arc and improves the slag and bead form, but excessive amounts must be avoided because of the resulting excessive slag fluidity.

Optional nonmetallic ingredients of the coating include silica ($SiO_2$) and various high silicate content compounds such as feldspar and mica. The range of the total amounts of these substances is up to about 15 pbw. The presence of $SiO_2$ in the coating has a beneficial effect on the physical characteristics of the slag.

METALLIC INGREDIENTS

While good results can be had with from 30 to 50 pbw of metal powders, coatings comprising the preferred embodiments of the present invention have metallic powder contents of from about 40 to about 46 pbw for each 100 pbw of nonmetallic components. A major function of this metallic powder is to serve as a filler to improve the bond quality and mechanical integrity of the coating. The need for this function results in part from the fact that many nonmetallic ingredients of the coating are normally obtainable only as fine powders, and the presence of a large proportion of such nonmetallic fine powder in a coating containing little or no metal powder results in a poorly bonded coating. During baking, such a coating tends to shrink excessively and to crack and to spall off the core wire. The addition of the metal powder substantially relieves this tendency and has the effect of making the coatings free of cracks and satisfactorily resistant to being chipped off from the core wire on impact.

In view of the fact that the preponderant share of the metallic powder in the preferred embodiments of the invention is used primarily as a filler, the chemical composition of the metallic powder mixture can be selected so as to obtain additional secondary or optional objectives. A metal powder content of about 43 pbw in the coating will account for about 12 percent of the weight of the weld metal and accordingly the coating metal powder can make a significant contribution to the alloy composition of the weld. Consequently, the metal powder mixture is preferably selected so as to provide when melted with the core wire, the exact weld alloy composition desired. If this is identical to the core-wire composition, the proportions of the various metallic elements in the coating should be approximately the same as those desired in the weld, with due allowance for known variations of the efficiency of transfer and recovery of the respective elements. Manganese, which is a suitable metal for use here, is usually characterized by relatively low efficiency of transfer, and therefore the proportion of Mn in the metal-powder mixture should be somewhat higher than that in either the core wire or the final weld metal.

Desirable metal powders comprise as the major component; namely, from 20 to 40 pbw, iron, nickel, chromium, and molybdenum, and alloys thereof, such as ferro-molybdenum and ferro-chromium, or admixtures of two or more.

The particle size of the metal powders may range from 30 mesh down to 200 mesh, good results being had with metal powders of predominantly 40 mesh size. However, mixtures of various degrees of fineness may be used.

Relatively small amounts of Al, Ti, Si, and other similar strongly reducing metal powders are used as metallic components of welding electrode coatings to serve as deoxidizers of the weld metal, the range being from about 0.5 to about 4 pbw. About 1 pbw of a powdered master alloy of Mn and Al is used as a deoxidizer in certain preferred embodiments of the invention.

It is preferred that the concentrations of various potent strengthening elements like C, N, V, and B be relatively low in the core wire and relatively high in the weld metal. In the case of the special alloys, the "relatively low" concentrations of C, N, V and B would be those in the vicinity of the lower limits of these elements listed in Table I, and the "relatively high" concentrations of these elements would be significantly higher, approaching the respective upper limits shown in Table I. The core wire can then be fabricated with relative ease, since its relatively low strength enables easy deformation during wiredrawing, straightening, cutting and the like. The weld metal can be made much stronger than the core wire by the addition of suitable amounts of one or more master alloys containing high proportions of C, N, V, and B to the electrode coatings. Such master alloys are ferro-vanadium and ferro-boron. High carbon iron and manganese nitride can be used. Such weld strengthening is the main purpose of the ferro-vanadium powder in the coatings of certain of the preferred embodiments of the invention.

COATING COMPOSITIONS OF PREFERRED EMBODIMENTS

Several preferred coating compositions of the invention, applied to five-thirty second inch diameter wire of special metal having the compositions of Table III as detailed hereafter, are presented in Table II, which also includes the numerical scores indicative of the relative performance of the electrodes in two important weldability areas. These are abbreviated as MPW, which stands for "multiposition weldability," and as SRE, which stands for "slag-removal ease." Scores varying from 0 (very poor) to 4.0 (excellent) were assigned to these and other aspects of weldability on the basis of the experimenters' personal judgements of the electrodes' performance.

TABLE II

[Coating formulae of preferred embodiments and resulting weldability scores (ingredient amounts are in pbw.)]

| Electrode number | 120 | 125 | 124 | 122 | 127 | 128 | 136 | 140, 140-M. | 143, 194 |
|---|---|---|---|---|---|---|---|---|---|
| $TiO_2$ | 20 | 12 | 29 | 29 | 16 | 6 | 6 | 30 | |
| K titanate | 20 | 20 | 25 | | | | | | |
| Na titanate | | 20 | | 20 | 15 | 15 | 15 | 22 | |
| Ca titanate | | | | | 30 | 30 | 30 | | |
| $CaCO_3$ | 25 | 15 | 15 | 20 | 10 | 10 | 10 | 20 | |
| $Al_2O_3$ | 10 | 10 | 8 | 8 | 8 | 10 | 9 | 8 | |
| $Cr_2O_3$ | | | 2 | | | | | | |
| $CaF_2$ | 10 | 8 | 2 | 8 | | | | | |
| $Na_3AlF_6$ | | | 4 | | 6 | 4 | 4 | 5 | |
| Feldspar | | | | | | | 5 | | |
| Silica | | | | | | 10 | 6 | | |
| Iron | 21 | 23 | 17 | 15 | 10 | 17 | 21 | 23 | |
| Mn | 4 | 4 | 4 | 7 | 8 | 5 | 5 | 4 | |
| Ni | 9 | 9 | 9 | 8 | 11 | 9 | 9 | 9 | |
| Cr | 7 | 3 | 4 | 4 | 3 | 6 | 3 | 3 | |
| FeMo | 2 | 3 | 6 | 6 | 11 | 6 | 3 | 3 | |
| FeV | | | | 3 | 3 | 1 | 1 | 2 | |
| MnAl | | | 1 | | | | | 1 | |
| MPW* | 2.0 | 2.0 | 4.0 | 3.0 | 4.9 | 3.6 | 3.6 | 3.8 | |
| SRE** | 2.3 | 2.7 | 2.0 | 3.0 | 3.3 | 3.7 | 3.7 | 3.8 | |

*Multiple-position weldability.
**Slag-removal ease.

In addition to the coating ingredients listed in Table II, the coatings of all electrodes contained about 1 pbw CMC and about 13 pbw of a silicate binder consisting usually of potassium and sodium silicates in approximately a 2:1 ratio. The coatings also usually contained about 0.5 pbw calcium silicate. The total metal powder contents of the coatings were all about 42.9 pbw.

The electrode with the lowest average weldability score in Table II is No. 120, the performance of which is "fair" with respect to multiple-position welding and only slightly better with respect to ease of slag removal. The amounts had identities of the nonmetallic coating ingredients of Electrode No. 120 include 20 pbw as the total amount of rutile and anatase, 20 pbw potassium titanate, 25 pbw $CaCO_3$ in the form of marble, 10 pbw $Al_2O_3$, and 10 pbw $CaF_2$.

A better SRE score characterizes Electrode No. 125, the nonmetallic portion of which is similar to that of No. 120 except that, in effect, 20 pbw sodium titanate has been added while the $CaCO_3$ content has been decreased from 25 to 15 pbw, the total amount of rutile and anatase has been decreased from 20 to 12 pbw, and the $CaF_2$ content has been decreased from 10 to 8 pbw.

Electrode No. 124 exhibits far better multiposition welding capability than does No. 120 but is slightly poorer with respect to the ease of slag removal. The improvement of the latter in going from No. 120 to No. 125 is therefore attributable primarily to the 20 pbw sodium titanate addition rather than to the accompanying decrease of the $CaCO_3$ or $CaF_2$ content. This observation is confirmed by a comparison of the results obtained from Electrodes Nos. 125 and 122, both of which contained 20 pbw sodium titanate and both of which had "-good" slag-removal ease.

The improvement of the multiposition welding capability from "fair" to "good" and then to "excellent" in going from Electrode No. 125 to No. 122 and then to No. 124 is attributable to the combination of the increase of the rutile content from 12 to 29 pbw and the replacement of most of the $CaF_2$ by cryolite. Confirmation of this conclusion is provided by the fact that the other coating formulas in Table II, which include from 4 to 6 pbw cryolite and no $CaF_2$, are all characterized by MPW scores of at least 3.6. The very-good-to-excellent multiposition welding capability of all such electrodes is attributable primarily to the combination of about 5 pbw cryolite and a total amount of rutile and the titanates of sodium and calcium of at least 50 pbw. In going from No. 122 to No. 127, then, the increase of the MPW score from 3.0 to 4.0 is attributable primarily to the replacement of 8 pbw $CaF_2$ by 6 pbw cryolite.

The substantial improvement of the ease of slag removal accompanying replacement of Electrode No. 124 by No. 127 is attributable primarily to the addition of both sodium titanate and calcium titanate to replace potassium titanate. Additional improvement of SRE is attributable to the addition of silica and feldspar at the expense of rutile in Nos. 128 and 136, as well as to upward adjustments of the amounts of $CaCO_3$ and sodium titanate at the expense of calcium titanate in the group of electrodes including No. 140. The latter electrodes differ from No. 122 primarily in containing 5 pbw cryolite instead of 8 pbw $CaF_2$, and this rather small change of the amount and kind of fluoride is the main explanation for the marked superiority of No. 140 with respect to both the multiposition welding capability and the slag removal ease.

Although the various electrodes described by Table II also differ in the amounts of their various metallic ingredients, these variations have relatively little effect on the weldability properties. Accordingly, both the MPW and SRE scores in Table II can be correlated primarily with the nonmetallic ingredient formulas alone.

Although certain electrodes described by Table II have definitely higher values of the respective weldability scores than others and would be preferred on the basis of these results alone, all of the electrodes performed in at least a "-fair" manner with respect to the weldability criteria considered, and all are preferred embodiments of the invention. The electrodes designated No. 140, 140-M, 143 and 194 are particularly preferred embodiments of the invention.

In summary, an optimum balance of the two weldability properties of interest in Table II results from the use of coatings that contain no $CaF_2$ and no $K_2Ti_3O_7$ in addition to having a rutile and titanate content of 51 to 61 pbw, of which from 22 to 45 pbw is the total amount of the titanates of sodium and calcium. The coatings also contain from 4 to 6 pbw cryolite, from 10 to 20 pbw $CaCO_3$ (as ground marble), from 8 to 10 pbw $Al_2O_3$, and from 0 to 11 pbw as the total amount of feldspar + silica.

MECHANICAL PROPERTIES OF WELDS

Welded joints made from the covered welding electrodes comprised of the above coatings and core wires of special alloys possess unique combinations of mechanical properties that render these electrodes particularly valuable for the assembly of high-strength fully austenitic steel structures, especially those subjected to stress at cryogenic temperatures. The weld mechanical properties are sensitive functions of the carbon, silicon, nitrogen, vanadium, and boron contents of the weld metal. The amounts of these elements in the weld metal are determined by the concentrations of these elements in the core wire as well as in the coating. With a given coating, therefore, any differences of the concentrations of the various elements in different core wires will be reflected in differences of the compositions and properties of the respective welds.

Three different heats of special alloy core wire having significant differences of the concentrations of C, N, V, Si, and B were used in defining the limits of the ranges of mechanical properties of welded joints made from the higher-strength versions of the covered electrodes constituting the preferred embodiments of the present invention. The chemical compositions of the three core-wire heats are shown in Table III.

TABLE III

| Wire Heat No. | Chemical Compositions of Core Wires (in wt. %) | | |
|---|---|---|---|
| | 7140 | 7152 | 91082 |
| Cr | 15.1 | 16.1 | 15.4 |
| Ni | 21.9 | 20.1 | 22.1 |
| Mn | 10.0 | 9.9 | 10.1 |
| Mo | 2.26 | 1.95 | 2.05 |
| N | 0.31 | 0.13 | 0.18 |
| V | 0.19 | <0.01 | 0.24 |
| B | 0.003 | 0.002 | 0.036 |
| Zr | <0.003 | 0.012 | 0.001 |
| C | 0.053 | 0.008 | 0.012 |
| Si | 0.00 | 0.02 | 0.12 |
| S | 0.007 | 0.006 | 0.006 |
| P | | 0.002 | 0.008 |
| O | 0.012 | 0.010 | |
| al. | | 0.01 | |
| Ti | 0.03 | <0.004 | |

Of the various preferred embodiments of the invention given in Table II, Electrode Nos. 136 and 194 had core wires of Heat 7152, No. 140-M had core wire of Heat 91082, and Nos. 122, 125, 127, 128, 140, and 143 had core wires of Heat 7140. The mechanical properties of the resulting as-deposited welds are shown in Table IV.

TABLE IV

[Mechanical properties of as-deposited welds derived from preferred embodiments]

| | Wire heat number | | | | | | | |
|---|---|---|---|---|---|---|---|---|
| | 7140 | | | | | 7152 | | 91082 |
| Electrode Number | 125 | 122 | 127 | 128 | 143 | 136 | 194 | 140-M |
| Temp (° F.): | | | | | | | | |
| Room temp.: | | | | | | | | |
| YS | 66 | 76 | 67 | 73 | | 61 | 61 | 64 |
| UTS | 100 | 108 | 104 | 107 | | 91 | 88 | 93 |
| El | 42 | 36 | 43 | 42 | | 41 | 38 | 38 |
| RA | 60 | 58 | 57 | 54 | | 61 | 60 | 57 |
| −423° F.: | | | | | | | | |
| YS | 151 | 159 | 162 | 169 | | | 148 | 149 |
| UTS | 186 | 193 | 202 | 206 | | | 194 | 192 |
| El | 37 | 36 | 33 | 32 | | | 37 | 26 |
| RA | 31 | 28 | 27 | 27 | | | 37 | 26 |
| −423° F.: UTS | 268 | 267 | 279 | 275 | | | 245 | 249 |
| Notched: RA | 9 | 5 | 9 | 4 | | | 14 | 15 |
| −320° F.: CVN, ft. No. | | | 33 | 24 | 45 | | 40 | 31 |

YS is 0.2 percent - offset yield strength in thousands of p.s.i.
UTS is ultimate tensile strength in thousands of p.s.i.
El is elongation in percent.
RA is reduction of area in percent.
CVN is Charpy V-notch impact energy in foot-pounds.

Table IV shows that the welds with the highest strengths at both ambient and cryogenic temperatures were derived from wire Heat 7140. This result is consistent with the relatively high concentrations of C, N and V in that wire. Table IV shows that the ultimate tensile strength (UTS) values of the welds derived from this wire are consistently at least 100,000 p.s.i. at room temperature and about 200,000 p.s.i. at −423° F. The tensile ductility of the welds at −423° F. is at least 32 percent elongation and 27 percent RA.

The lowest-strength welds in Table IV were derived from wire of Heat 7152, the values of the UTS being 88,000 and 194,000 p.s.i. at 75 and −423° F., respectively. This weld metal also has the highest tensile ductility at −423° F., namely 37 percent elongation and 37 percent RA. Essentially the same strength with lower ductility at −423° F. characterizes the weld metal derived from the core wire of Heat 91082.

The results of notched tensile tests at −423° F. indicate that the welds are not notch sensitive at cryogenic temperatures. This is demonstrated by the fact that the UTS measured in each notched-specimen test at −423° F. is invariably at least 30 percent higher than that of a plain-bar specimen taken from the same weld and tested at the same temperature.

The low-temperature impact resistance of the welds is indicated by the results of the −320° F. Charpy V-notch impact tests listed in Table IV. The range of these test results is from 24 to 45 foot pounds, which is acceptable.

The quantities of major practical importance in Table IV are the weld tensile strength at room temperature and the ductility, notch sensitivity and impact resistance at cryogenic temperatures. Satisfactory values of all of these important properties are provided by the present invention.

It is understood that the above specification and drawing are merely exemplary and not in limitation of the invention.

What is claimed is:

1. An arc welding electrode for welds characterized by good strength and high ductility from cryogenic temperatures up to at least 900° F. and facilitates welding comprising a fully austenitic steel wire core, and a protective coating on the wire core containing about 30 to 50 pbw of metal ingredients for each 100 pbw of nonmetallic ingredients, the metallic ingredients comprising at least one element selected from the group consisting of iron, nickel, chromium, molybdenum, vanadium, boron, aluminum, titanium, and manganese, the nonmetallic ingredients comprising from about 20 to 70 pbw of at least one titanium-containing compound selected from the group consisting of rutile, anatase, and titanates of alkali and alkaline earth elements, from about 10 to 25 pbw of a carbonate of an alkaline-earth metal, a total of from about 5 to 15 pbw of at least one oxide selected from the group consisting of $Al_2O_3$ and $Cr_2O_3$, a total of from about 4 to 20 pbw of $CaF_2$ and $Na_3AlF_6$, up to about 15 pbw of $SiO_2$ derived from silica or a high silica compound, and up to about 3 pbw of a slip agent.

2. The electrode of claim 1 wherein the metallic ingredients comprise about 40 to 46 pbw.

3. The electrode of claim 1 wherein the metallic ingredients comprise metal powders.

4. The electrode of claim 1 wherein the carbonate is $CaCO_3$.

5. The electrode of claim 1 wherein the amount of $Al_2O_3$ is about 8 to 10 pbw.

6. The electrode of claim 1 wherein there is about 5 pbw of $CaF_2$ and $Na_3AlF_6$ in the coating.

7. The electrode of claim 1, wherein the slip agent is an organic gum.

* * * * *